United States Patent
Yamamoto

(10) Patent No.: US 10,591,148 B2
(45) Date of Patent: Mar. 17, 2020

(54) LIGHTING DEVICE THAT STORES ROTATION ANGLE OF HEAD

(71) Applicant: CANON KABUSHIKI KAISHA, Tokyo (JP)

(72) Inventor: Yutaka Yamamoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/787,945

(22) Filed: Oct. 19, 2017

(65) Prior Publication Data

US 2018/0112859 A1    Apr. 26, 2018

(30) Foreign Application Priority Data

Oct. 24, 2016 (JP) .................................. 2016-207666

(51) Int. Cl.
  *G03B 15/05* (2006.01)
  *F21V 21/15* (2006.01)
  (Continued)

(52) U.S. Cl.
  CPC .............. *F21V 21/15* (2013.01); *F21V 14/02* (2013.01); *F21V 21/30* (2013.01); *G03B 15/03* (2013.01); *G03B 15/05* (2013.01)

(58) Field of Classification Search
  CPC ...... F21V 33/0052; G03B 15/03; G03B 15/05
  (Continued)

(56) References Cited

U.S. PATENT DOCUMENTS 9,395,600 B2   7/2016 Yamashita
2010/0329302 A1*  12/2010 Nakagawa ............ G01J 5/0003
                                                              374/130
(Continued)

FOREIGN PATENT DOCUMENTS

JP    H04340527 A    11/1992
JP    2008180913 A    8/2008
(Continued)

OTHER PUBLICATIONS

Extended European Search Report issued in European Appln. No. 17001739.6 dated Feb. 23, 2018.
(Continued)

*Primary Examiner* — Sean P Gramling
*Assistant Examiner* — Keith G. Delahoussaye
(74) *Attorney, Agent, or Firm* — Rossi, Kimms & McDowell LLP

(57) ABSTRACT

A lighting device that stores a rotation angle of a head unit, on which a user's intention is properly reflected. The lighting device includes a main unit, a head unit that includes a light emission section and is rotatable with respect to the main unit, a bounce angle storage circuit that stores a rotation angle of the head unit with respect to the main unit, a bounce angle detection circuit that detects whether or not the head unit is rotated with respect to the main unit, and a rotation angle of the head unit, and a storage button. When rotation of the head unit is detected, rotation angles detected by the bounce angle detection circuit last time are stored in the bounce angle storage circuit in response to a predetermined operation for releasing the storage button from a depressed state.

8 Claims, 10 Drawing Sheets

(51) Int. Cl.
*G03B 15/03* (2006.01)
*F21V 14/02* (2006.01)
*F21V 21/30* (2006.01)

(58) Field of Classification Search
USPC .......................................... 362/16; 396/544
See application file for complete search history.

(56) References Cited

U.S. PATENT DOCUMENTS

| | | |
|---|---|---|
| 2014/0240950 A1 | 8/2014 | Ueda et al. |
| 2015/0062861 A1* | 3/2015 | Yamashita ............. G03B 15/05 362/5 |
| 2015/0309390 A1 | 10/2015 | Yamamoto |

FOREIGN PATENT DOCUMENTS

| | | |
|---|---|---|
| JP | 2009075340 A | 4/2009 |
| JP | 2011170014 A | 9/2011 |
| JP | 2015049280 A | 3/2015 |
| WO | 2013161224 A1 | 10/2013 |

OTHER PUBLICATIONS

Office Action issued in Russian Appln. No. 2017137118 dated Nov. 21, 2018. English translation provided.

\* cited by examiner

LIGHTING DEVICE THAT STORES ROTATION ANGLE OF HEAD

BACKGROUND OF THE INVENTION

Field of the Invention

The present invention relates to a lighting device used e.g. for shooting, which stores a rotation angle of a head.

Description of the Related Art

Conventionally, there has been known flash shooting in which when shooting an object, light is emitted from a lighting device toward e.g. a ceiling, and the object is irradiated with diffusely reflected light from the ceiling (hereinafter referred to as bounce flash shooting). Since the use of the bounce flash shooting makes it possible to indirectly irradiate the light from the lighting device to the object, the object can be rendered in soft light. In a lighting device disclosed in Japanese Laid-Open Patent Publication (Kokai) No. 2008-180913, a head unit (light emission section) can be manually rotated. Further, as disclosed in Japanese Laid-Open Patent Publication (Kokai) No. 2011-170014 and Japanese Laid-Open Patent Publication (Kokai) No. 2009-75340, there has been proposed a lighting device (strobe device) equipped with a so-called automatic bounce function for automatically adjusting an irradiation direction by a drive mechanism using a drive source, such as a motor. From the viewpoint of user-friendliness, the strobe device having the automatic bounce function is desired to have a structure in which the head unit can not only be automatically driven, but also can be manually rotated by a user directly holding the head unit.

However, the head unit which is manually rotatable can also be rotated by receiving an unexpected external force, and hence the head unit is sometimes rotated to a rotation angle which is not intended by a user. If the user performs shooting without noticing a change in rotation, it is impossible to properly irradiate an object. If the rotation angle is unintentionally changed, the user cannot be sure of an originally intended position of the head unit, and it is troublesome to set the angle again.

Incidentally, a lighting device disclosed in Japanese Laid-Open Patent Publication (Kokai) No. 2015-49280 determines whether the head unit is rotated by a user or unexpectedly rotated by an external force, based on whether or not a plurality of portions of the head unit are touched or based on an amount of change in the rotation angle of the head unit. Then, in a case where the head unit is rotated by the user, if the head unit is stopped at a standard angle at which the head unit is locked by a click mechanism, the angle is stored, whereas if not, the head unit is automatically driven to a closest standard angle, and the angle is stored. However, it is not easy for the user to touch the plurality of portions, and further, if the determination is based on an amount of change in the rotation angle, it is impossible to accurately determine whether or not the head unit is rotated by the user. That is, when a rotation angle of the head unit is stored after a change thereof, it is not necessarily possible to cause a user's intention to be properly reflected on the stored rotation angle.

SUMMARY OF THE INVENTION

The present invention provides a lighting device that stores a rotation angle of a head unit, on which a user's intention is properly reflected.

In a first aspect of the present invention, there is provided a lighting device comprising a first housing, a second housing that has a light emission section and is rotatable with respect to the first housing, a detection unit configured to detect relative position information of the second housing with respect to the first housing, a storage section configured to store the relative position information detected by the detection unit, a drive unit configured to cause the second housing to rotate with respect to the first housing based on the relative position information stored in the storage section, an operation portion provided on the second housing, and a control unit configured to cause the relative position information detected by the detection unit to be stored in the storage section in response to a predetermined operation on the operation portion.

In a second aspect of the present invention, there is provided a lighting device comprising a first housing, a second housing that has a light emission section and is rotatable with respect to the first housing, a detection unit configured to detect relative position information of the second housing with respect to the first housing, a storage section configured to store the relative position information detected by the detection unit, a drive unit configured to cause the second housing to rotate with respect to the first housing based on the relative position information stored in the storage section, an operation portion, and a control unit configured to cause the relative position information detected by the detection unit to be stored in the storage section in response to release of an operation on the operation portion.

According to the present invention, it is possible to store a rotation angle of the head unit of the lighting device, on which a user's intention is properly reflected.

Further features of the present invention will become apparent from the following description of exemplary embodiments (with reference to the attached drawings).

BRIEF DESCRIPTION OF THE DRAWINGS

FIG. 1B is a side view of the strobe device shown in FIG. 1A.

FIG. 1C is a rear view of the strobe device shown in FIG. 1A.

FIG. 1D is a side view of the strobe device shown in FIG. 1A, as viewed from a direction opposite to the direction in FIG. 1B.

DESCRIPTION OF THE EMBODIMENTS

The present invention will now be described in detail below with reference to the accompanying drawings showing embodiments thereof.

Figure 1A:
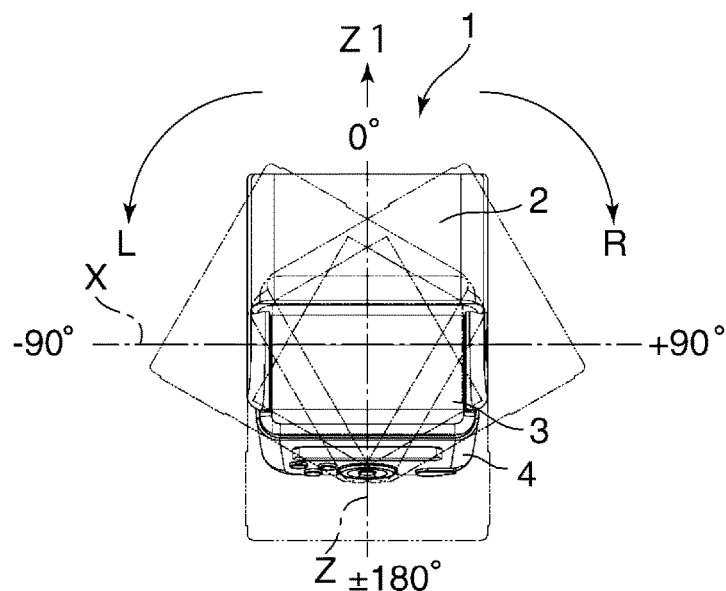
FIG. 1A is a top view of a strobe device as a lighting device according to a first embodiment of the present invention.
Figure 1A:
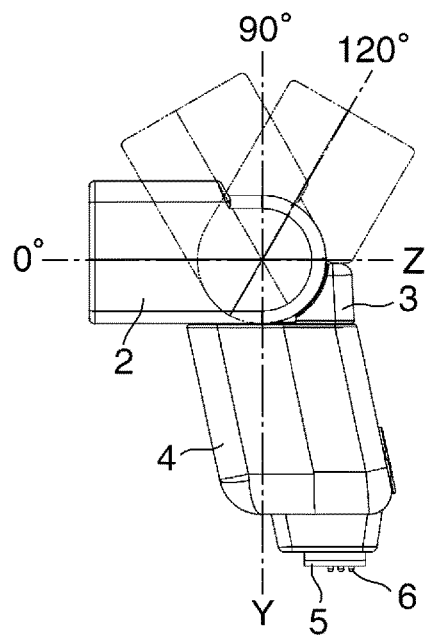
Figure 1A:
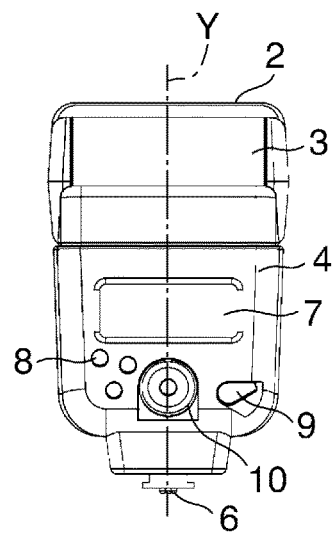
Figure 1A:
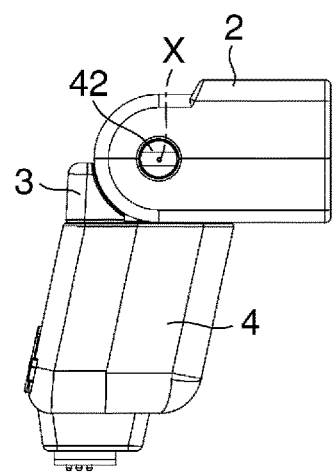
Figure 2A:
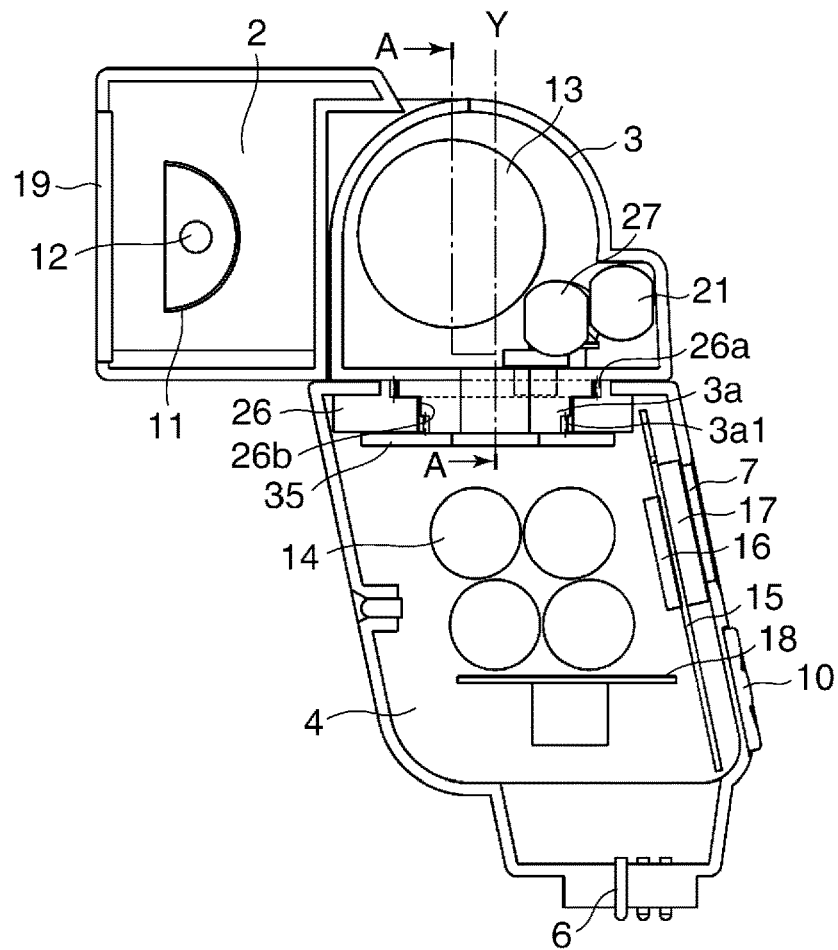
FIG. 2A is a view showing a central cross-section of the strobe device in its entirety.
Figure 2B:
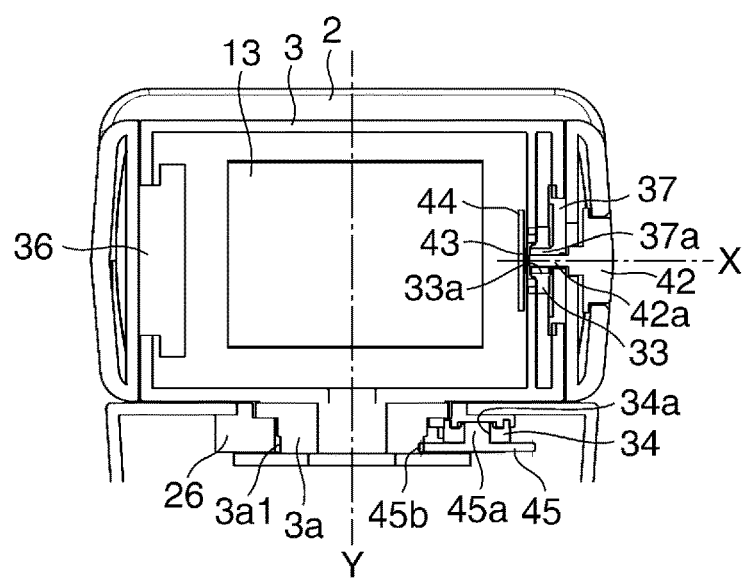
FIG. 2B is a local cross-sectional view of the strobe device, taken along A-A of a bounce unit appearing in FIG. 2A.
Figure 3:
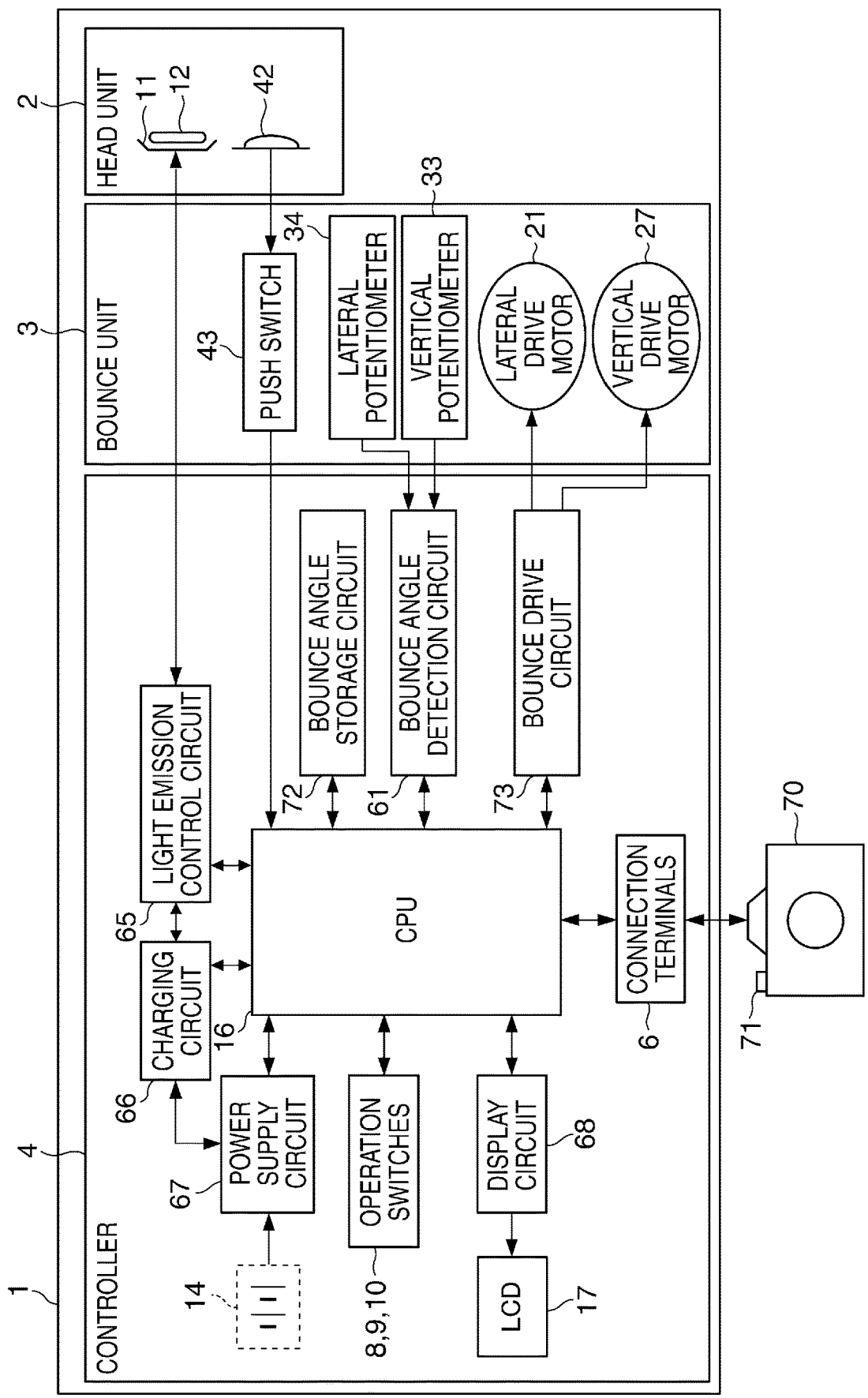
FIG. 3 is a block diagram of the control-related internal configuration of the strobe device.

FIGS. 1A to 1D are a top view, a side view, a rear view, and a side view of a lighting device according to a first embodiment of the present invention. This lighting device is configured as a strobe device 1. FIGS. 2A and 2B are cross-sectional views of the strobe device 1. FIG. 2A shows a central cross-section of the strobe device in its entirety, and FIG. 2B shows a local cross-section of a bounce unit 3 appearing in FIG. 2A, taken along A-A in FIG. 2A. FIG. 3 is a block diagram of the control-related internal configuration of the strobe device 1.

The strobe device 1 is housed in the three housings of a head unit 2, the bounce unit 3, and a controller 4. The head unit 2 can be rotated about an X axis with respect to the bounce unit 3, and the bounce unit 3 can be rotated about a Y axis with respect to the controller 4 in a state holding the head unit 2. Hereafter, a direction in which the head unit 2 is rotated about the X axis and a direction in which the head unit 2 is rotated about the Y axis, in FIGS. 1A to 1D, are referred to as the vertical direction and the lateral direction, respectively. Further, in the lateral direction, a direction indicated by an arrow R in FIG. 1A and a direction indicated by an arrow L in FIG. 1A, as viewed from the above of the strobe device 1, are defined as the right direction and the left direction, respectively. Therefore, FIG. 1B and FIG. 1D show a left side and a right side of the strobe device 1, respectively.

A position of the head unit 2 in which the head unit 2 irradiates light in a direction in which the head unit 2 faces, as indicated by solid lines in FIG. 1A (Z1 direction on a Z axis) is defined as the normal position (0° in the vertical direction and 0° in the lateral direction). The head unit 2 is capable of performing rotation (bounce angle-changing operation) through a maximum of 120° in the vertical direction (see FIG. 1B) and through a maximum of 180° in the lateral direction (see FIG. 1A), as indicated by two-dot chain lines. That is, a movable unit formed by the head unit 2 and the bounce unit 3 is held in a manner rotatable with respect to the controller 4 as a main unit, up to respective predetermined angles in the vertical direction and the lateral direction. Hereafter, the rotational operation and rotation angle of the head unit 2 with respect to the controller 4 in the vertical and lateral directions are also referred to as the bounce angle-changing operation and the bounce angle, respectively. Note that when the head unit 2 is in the normal position, the bounce angles in both of the vertical and lateral directions are equal to 0°. Since the head unit 2 is movable with respect to the controller 4, the vertical and lateral positions and rotations of the head unit 2 are described with reference to the normal position.

The bounce angle-changing operation can be performed as automatic rotation of the head unit 2 by a drive mechanism having a motor as a drive source, referred to hereinafter, and manual rotation of the head unit 2 by a user who directly holds the head 2 and applies an external force thereto. The rotation by the drive mechanism is mainly used for a function in which the strobe device 1 (or a camera or a camera system, connected to the strobe device 1) selects a proper irradiation direction (bounce angle) and causes the head unit 2 to automatically rotate, before performing flash shooting, i.e. a so-called automatic bounce function.

A light emitting optical unit formed by a xenon tube 12, a reflection umbrella 11, and a Fresnel lens 19 is incorporated in the housing of the head unit 2. The light emitting optical unit may include a so-called zoom mechanism for changing an irradiation range by moving the xenon tube 12 and the reflection umbrella 11 relative to the Fresnel lens 19 in an optical axis direction. Note that as the zoom mechanism, a known structure can be employed, and hence detailed description thereof is omitted. A main capacitor 13 for accumulating high-voltage electric charges for causing the xenon tube 12 to emit light is accommodated in the housing of the bounce unit 3. Further, the housing of the bounce unit 3 accommodates most part of a vertical drive mechanism 63 (see FIG. 6) for rotating the head unit 2 in the vertical direction, which uses a vertical drive motor 27, referred to hereinafter, as a drive source, and a lateral drive mechanism 62 (see FIG. 6) for rotating the head unit 2 in the lateral direction, which uses a lateral drive motor 21, referred to hereinafter, as a drive source.

A lateral drive end gear 26 is fixed to a top of the controller 4 from the inside of the controller 4. The bounce unit 3 has a shaft portion 3a supported in a bearing hole 26b formed in the lateral drive end gear 26, whereby the bounce unit 3 can be rotated with respect to the controller 4 in the lateral direction. The shaft portion 3a is a rotating shaft corresponding to the Y axis. The bounce unit 3 is retained by a rotation locking plate 35 fixed to a bottom of the shaft portion 3a. A push switch 43 operating as part of an operation portion for causing a bounce angle, referred to hereinafter, to be stored, and a small board 44, referred to hereinafter, are also accommodated in the bounce unit 3 (see FIG. 2B).

A main board 15 on which is mounted a CPU 16 that controls the operation of the strobe device 1 is accommodated in the housing of the controller 4 (see FIG. 2A). A display circuit 68 for causing an LCD 17 to operate as a display section for external display, a bounce angle detection circuit 61 (detection unit), referred to hereinafter, a bounce drive circuit 73, etc., are connected to the CPU 16 (see FIG. 3). The bounce angle detection circuit 61 acquires information on whether or not the head unit 2 is rotated, and the rotation angles, based on results of detection by a vertical potentiometer 33 and a lateral potentiometer (see FIGS. 2B and 3), referred to hereinafter. Note that it is only required to detect relative position information of the movable unit with respect to the controller 4, and the configuration may be such that information other than the rotation angle is detected. Further, a bounce angle storage circuit 72 is a storage section for storing, as required, angle information of the head unit 2, which is obtained by the bounce angle detection circuit 61. As the bounce angle storage circuit 72 (hereinafter simply referred to as the "storage circuit 72"), an internal memory of the CPU or an external storage device, such as an EPROM, is used. On a rear surface of the controller 4, there are placed an LCD window 7 for viewing the LCD 17, operation buttons 8 for making various settings of the strobe device 1, and operation switches, such as a power switch 9 and a dial 10 (see FIGS. 1A to 1D). The controller 4 has a leg part 5 on a bottom thereof, on which are arranged a plurality of connection terminals 6 for performing communication with a camera 70 connected to the strobe device 1. A plurality of batteries 14 are mounted in the strobe device 1. A sub board 18 (see FIGS. 2A and 2B) on which are mounted a power supply circuit 67, part of a charging circuit 66 (see FIG. 3), and so forth is arranged below the batteries 14. A light emission control circuit 65, appearing in FIG. 3, is distributedly placed on the sub board 18, a board within the light emitting optical unit, not shown, and so forth.

The camera 70 (see FIG. 3) is connected to the strobe device 1 via the connection terminals 6, whereby it is made capable of communicating with the strobe device 1. The camera 70 is provided with a release switch 71 as an operation member, and when the release switch 71 is operated to turn on a first switch SW1 corresponding to a first stroke thereof, an AF (auto focusing) operation and a photometry operation of the camera 70 are started. Further, when the release switch 71 is further operated to turn on a second switch SW2 corresponding to a second stroke thereof, an exposure operation of the camera 70 is started.

A bounce angle storage button 42 is placed on a right side of the head unit 2 (see FIGS. 1D and 2B). The bounce angle storage button 42 (hereinafter simply referred to as the "storage button 42") is an operation portion for allowing the to perform an operation for causing a rotation angle to be stored in the storage circuit 72. The storage button 42 is disposed such that the user can depress the storage button 42. First, a structure related to the storage button 42 will be described.

As shown in FIG. 2B, the head unit 2 is supported on the bounce unit 3 by a vertical drive end gear 36 and a bearing 37, which are fixed from the inside of the bounce unit 3 to the head unit 2 on the X axis, in a manner rotatable in the vertical direction. The storage button 42 has a shaft portion 42a supported by the bearing 37, and is disposed to extend from the head unit 2 to the inside of the bounce unit 3. When the user depresses the storage button 42, the push switch 43 within the bounce unit 3 is pushed by the shaft portion 42a. Then, a signal indicating that the push switch 43 is pushed to turn on is sent to the CPU 16 via the small board 44, a connection cable, not shown, and so forth. As a result, it is detected that the storage button 42 is depressed. On the other hand, when the user performs an operation for releasing the storage button 42 from the depressed state, the push switch 43 is returned to an off position, and a signal indicating that the state of the push switch 43 has been changed from the on state to the off state is sent to the CPU 16. As a result, it is detected that the user has performed the operation for turning off the storage button 42.

The operation for releasing the storage button 42 from the depressed state after being once depressed as described above, i.e. release of the operation performed on the storage button 42, is defined as the "predetermined operation". Normally, when the user releases his/her finger after depressing the storage button 42, the predetermined operation is performed, but even when the finger is not completely released from the storage button 42, if the push switch 43 ceases to be in the on position, it is regarded that the predetermined operation is performed. When the storage button 42 is released, a result of detection of the bounce angles in the vertical and lateral directions by the bounce angle detection circuit 61 is stored in the storage circuit 72. That is, when the predetermined operation is performed, the bounce angles detected last time (the latest ones) can be stored in the storage circuit 72.

As a typical operation, the user rotates the head unit 2 while directly holding the same to thereby set the bounce angles to desired angles, whereafter the user depresses and releases the storage button 42 (on→off). Alternatively, in a case where the user has already been depressing the storage button 42 before setting the rotation angles of the head unit 2, the user sets the rotation angles and thereafter releases the storage button 42. By performing the above-mentioned operation, it is possible to store the desired bounce angles. By performing a bounce angle control process (see FIG. 8), described hereinafter, the CPU 16 determines whether the head unit 2 is rotated by an unexpected external force, or is operated by the user himself/herself, and in a case where the head unit 2 is rotated by an unexpected external force, the angles of the head unit 2 can be automatically returned to the original bounce angles. Here, the bounce angles are stored not when the storage button 42 is depressed (turned on), but when the storage button 42 is released (turned off). The predetermined operation is not set to a simple depressing operation because there is a possibility that the user has not finally set the bounce angles in a state in which the storage button 42 is being depressed. That is, there is a high possibility that the user may change the bounce angles as long as the storage button 42 is being depressed, but there is a high possibility that the user has set the bounce angles when the user has released the storage button 42.

Further, as shown in FIGS. 1D and 2B, the storage button 42 is placed on the X-axis on the right side surface of the head unit 2, i.e. on an axis of the shaft portion 42a. Placing the storage button 42 as above has several advantages. First, even when the head unit 2 has been vertically or laterally moved by bounce driving (driving for bounce flash shooting), a change in the position of the storage button 42 is not too large, and hence it is easy for the user to recognize the position of the storage button 42 when the user desires to operate the storage button 42. Further, the head unit 2 is liable to be rotated about the Y axis when an external force is received by a portion of the head unit 2 distant from the Y axis (e.g. a portion close to the Fresnel lens 19 of the head unit). However, the storage button 42 is depressed in an axial direction of the X axis, and the shortest distance between the X axis and the Y axis is small, and hence it is possible to prevent such an erroneous operation that the storage button 42 is depressed simultaneously when a rotational force is received due to unexpected interference between the head unit 2 and a foreign body. Further, when the user desires to rotate the head unit 2 while touching the storage button 42, it is easy for the user to hold the head unit 2. Further, as described hereinafter with reference to FIG. 4, an advantage is also obtained in shooting in portrait orientation.

Figure 4:
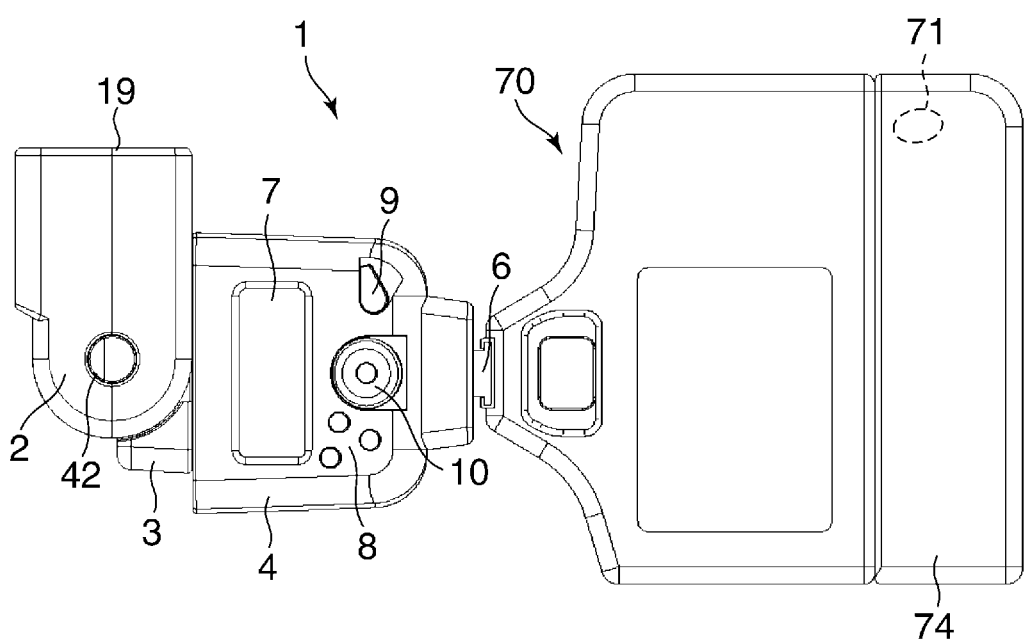
FIG. 4 is a rear view of the strobe device and a camera system in a state of shooting in portrait orientation.

FIG. 4 is a rear view of the strobe device 1 and the camera system in a state of shooting in portrait orientation. The camera 70 is connected to the controller 4 of the strobe device 1, and a vertical position grip 74 is mounted on the camera 70. In a case where the user uses the camera 70 in a posture in portrait orientation, when the head unit is moved to a bounce position in which the strobe device 1 emits light toward a ceiling, the storage button 42 comes to a position easily visible from the user. As shown in the illustrated example in FIG. 4, the general vertical position grip 74 has the release switch 71 disposed at a location where the release switch 71 can be operated by the right hand in a state of the vertical position grip 74 having been mounted on the camera 70. Therefore, when using the vertical position grip 74 by the right hand, the strobe device 1 is positioned on the left side of the user, as shown in FIG. 4. By placing the storage button 42 on the right side surface of the head unit 2, the storage button 42 comes to a position easily visible from the user when light is irradiated toward the ceiling in bounce flash shooting.

Next, a description will be given of a display state of the LCD 17 changed when the automatic bounce function is switched by the operation button 8 between on and off. A function of switching the automatic bounce function between on and off is assigned to one of the operation buttons 8.

Figure 5A:
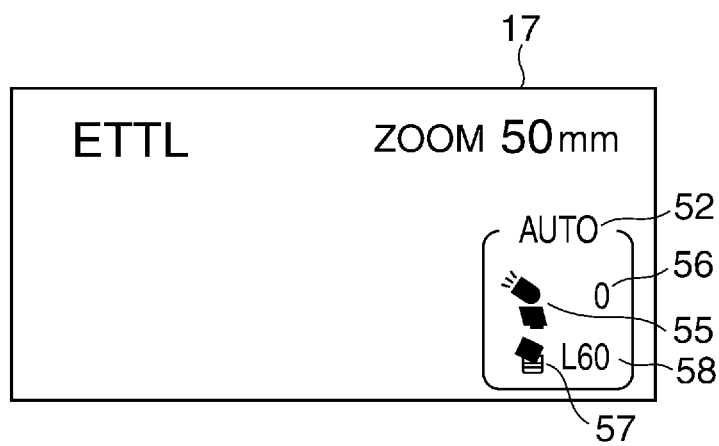
FIG. 5A is a view showing a display state of an LCD in an automatic bounce mode.
Figure 5B:
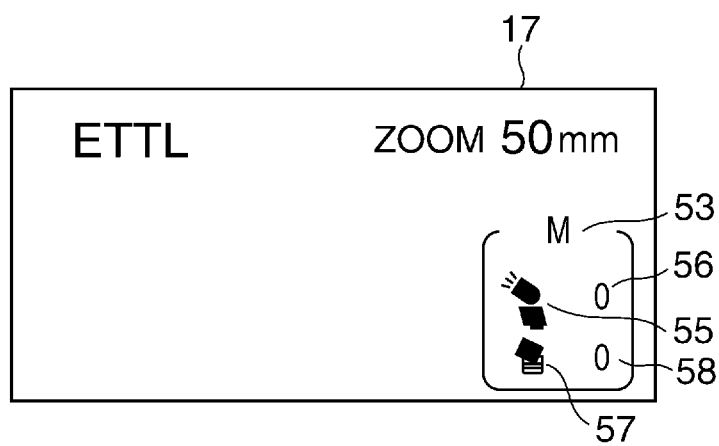
FIG. 5B is a view showing a display state of the LCD in a manual bounce mode.

FIGS. 5A and 5B are diagrams showing the display state of the LCD 17. Whenever the corresponding one of the operation buttons 8 is depressed, the strobe device 1 is switched between an automatic bounce mode in which the display state of the LCD 17 is shown as in FIG. 5A, and a manual bounce mode in which the display state of the LCD 17 is shown as in FIG. 5B. When an indicator 52 of "AUTO" is displayed on at a right side rear of the LCD 17 as shown in FIG. 5A, the strobe device 1 is in the automatic bounce mode in which the automatic bounce function of the strobe device 1 is in an enabled state. In the automatic bounce mode, the strobe device 1 (or the camera system to which the strobe device 1 is mounted) selects a proper bounce angle for shooting, and the head unit 2 is automatically rotated by the lateral drive mechanism 62 and the vertical drive mechanism 63. When an indictor 53 of "M" is displayed at the right side area of the LCD 17 as sown in FIG. 5B, the strobe device 1 is in the manual bounce mode in which the automatic bounce function of the strobe device 1 is in a disabled state. In the manual bounce mode, the user can set the angle of the head unit 2, as desired. In other words, the strobe device 1 in the manual bounce mode is the same as a conventional strobe device which does not perform the automatic bounce control. Needless to say, in the manual bounce mode, to rotate the head unit 2, a user's direct operation is required, such as an operation for holding and rotating the head unit 2.

Indicators 55 to 58 displayed on the LCD 17 indicate the current bounce angle stored in the storage circuit 72. An indicator 55 is an icon indicative of the vertical direction, and an indicator 56 indicates an angle in the vertical direction. An indicator 57 is an icon indicative of the lateral direction, and an indicator 58 indicates an angle in the lateral direction. Further, by changing the displayed angles using the other operation buttons, the dial 10, or the like, the head unit 2 can also be caused to be rotated using the lateral drive mechanism 62 and the vertical drive mechanism 63.

Figure 6:
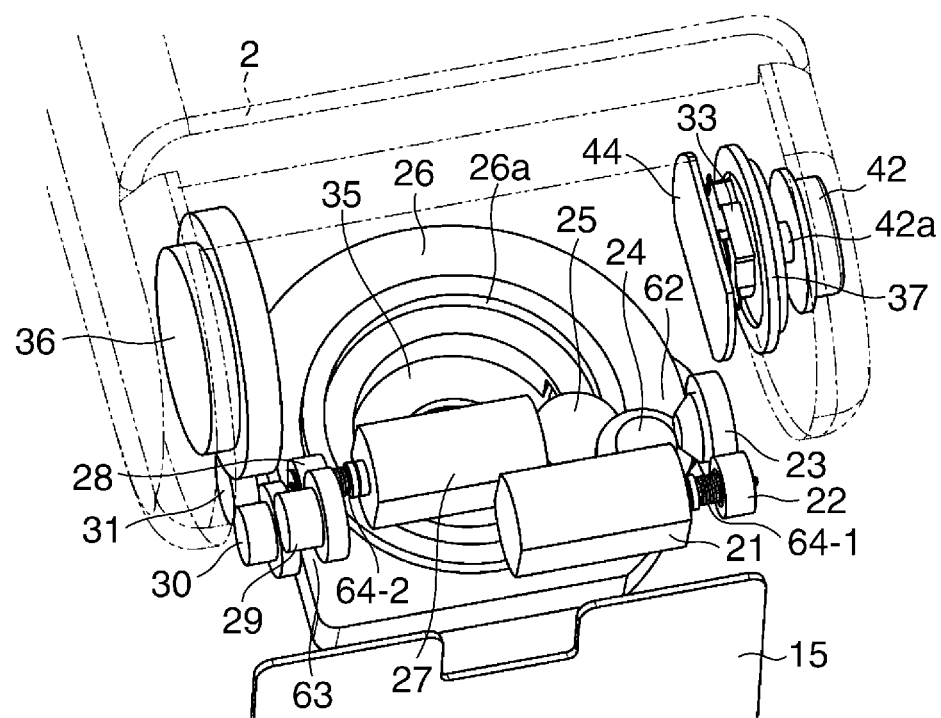
FIG. 6 is a perspective view showing a lateral drive mechanism and a vertical drive mechanism.

Next, the construction of each of the lateral drive mechanism 62 and the vertical drive mechanism 63 will be described. Further, the vertical potentiometer 33 and the lateral potentiometer 34 (see FIGS. 2B and 3) will also be described in addition thereto. FIG. 6 is a perspective view showing the lateral drive mechanism 62 and the vertical drive mechanism 63, which are arranged from within the housing of the bounce unit 3 to an upper part of the controller 4.

The lateral drive motor 21 and the vertical drive motor 27, which are used as the drive sources of the lateral drive mechanism 62 and the vertical drive mechanism 63, respectively, are DC motors, and are controlled by the bounce drive circuit 73 (see FIG. 3) including a general motor driver. First-stage gears 22 and 28, equipped with clutch mechanisms 64-1 and 64-2, respectively, are mounted on the drive motors 21 and 27, respectively.

Transmission gear wheels 29, 30, and 31 transmit a drive force of the first-stage gear 28 of the vertical drive motor 27 to the vertical drive end gear 36 at a proper reduction gear ratio. The vertical drive end gear 36 is rotated by the drive force transmitted by the transmission gear wheels 29, 30, and 31, whereby the head unit 2 directly connected to the vertical drive end gear 36 is rotated in the vertical direction. The vertical potentiometer 33 (see FIGS. 2B and 3) detects a rotation angle of the head unit 2 in the vertical direction. The vertical potentiometer 33 is a resistance type potentiometer that can detect an angle of a rotating shaft, and as shown in FIGS. 2B and 6, the vertical potentiometer 33 is fixed to the inside of the bounce unit 3 and has a hole 33a formed in the center thereof. A shaft portion 37a of the bearing 37 is inserted in the hole 33a of the vertical potentiometer 33, whereby the vertical potentiometer 33 can detect an amount of rotation of the bearing 37. The shaft portion 37a functions as a rotating shaft corresponding to the X axis. Further, the bearing 37 is fixed to the head unit 2, so that the vertical potentiometer 33 can detect a rotation angle of the head unit 2 relative to the bounce unit 3, i.e. a bounce angle of the head unit 2 in the vertical direction.

Transmission gear wheels 23, 24, and 25 transmit a drive force of the first-stage gear 22 of the lateral drive motor 21 to an internal gear 26a (see FIGS. 2A and 6) formed on an inner periphery of the lateral drive end gear 26 at a proper reduction gear ratio. A bevel gear mechanism is provided between the transmission gear wheels 23 and 24 to change the direction of the rotational axis through 90°. Since the lateral drive end gear 26 is fixed to the controller 4, when the lateral drive motor 21 is rotated to cause the internal gear 26a to receive a drive force from the transmission gear wheel 25, the bounce unit 3 is rotated together with the head unit 2 with respect to the controller 4 in the lateral direction.

The lateral potentiometer 34 (see FIGS. 2B and 3) detects an angle of the head unit 2 in the lateral direction, relative to the controller 4. The lateral potentiometer 34 is fixed to the lateral drive end gear 26 as shown in FIGS. 2B and 6, and has a hole 34a in the center thereof. A shaft portion 45a of a potentiometer gear 45 is inserted in the hole 34a, whereby the lateral potentiometer 34 can detect an amount of rotation of the potentiometer gear 45. The potentiometer gear 45 includes a spur gear 45b, to which rotation of the bounce unit 3 is transmitted from a bounce unit spur gear 3a1 formed on the shaft portion 3a of the bounce unit 3. Therefore, the lateral potentiometer 34 is capable of detecting a rotation angle of the bounce unit 3 relative to the controller 4, i.e. a bounce angle of the bounce unit 3 in the lateral direction, by detecting the rotation of the potentiometer gear 45. In turn, the lateral potentiometer 34 is capable of detecting a bounce angle of the head unit 2 with respect to the controller 4 in the lateral direction.

Figure 7:
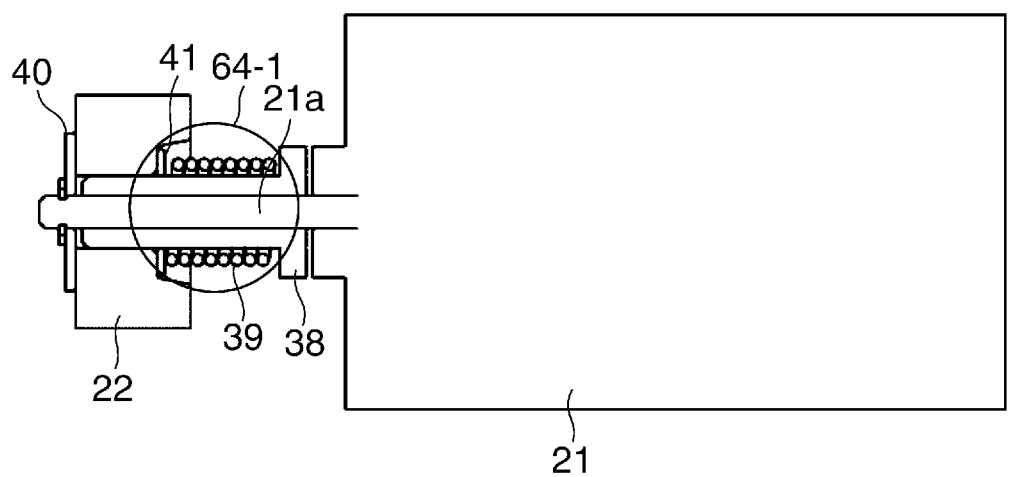
FIG. 7 is a cross-sectional view of a clutch mechanism of a first-stage gear.

Next, the clutch mechanisms 64-1 and 64-2 will be described in detail. FIG. 7 is a cross-sectional view of the clutch mechanism 64-1 of the first-stage gear 22 mounted on the lateral drive motor 21. Note that the clutch mechanisms 64-1 and 64-2, associated with the first-stage gears 22 and 28, respectively, have the same construction, and hence in the following, the construction of the clutch mechanisms 64-1 including the first-stage gear 22 is described on behalf of the constructions of the two clutch mechanisms 64-1 and 64-2, while the construction of the clutch mechanism 64-2 including the first-stage gear 28 is not specifically described.

The clutch mechanism 64-1 includes a pulley 38 which is fixed to a rotating shaft 21a of the lateral drive motor 21, the first-stage gear 22 which is supported on the pulley 38 in a freely rotatable manner, a friction spring 39, a friction washer 41, and a washer 40 which retains the first-stage gear 22. A rotational force of the pulley 38 is transmitted to the first-stage gear 22 by a friction force applied by an urging force of the friction spring 39. The clutch mechanisms 64-1 and 64-2 are provided in the lateral drive mechanism 62 and the vertical drive mechanism 63, respectively, so as to prevent an excessive load from being applied to the motors and the gear trains even if the head unit 2 collides against an obstacle during automatic rotation of the head unit 2. Note that in a state in which the strobe device 1 is powered on, the lateral drive motor 21 and the vertical drive motor 27 are controlled to be in a so-called braking state in which respective input terminals are short-circuited by the bounce drive circuit 73, which prevents the head unit 2 from being easily rotated by an external force. Connection forces of the clutch mechanisms 64-1 and 64-2 are each configured to generate a slip if the head unit 2 is rotated by an external force when the lateral drive motor 21 and the vertical drive motor 27 are in the braking state. To this end, the connection forces are set to proper values which are not so small as will allow the head unit 2 to rotate by its own weight but not so large as will make it is difficult for the user to directly hold and rotate the head unit 2 by hand. Although in the present embodiment, the clutch mechanisms 64-1 and 64-2 as general slipping clutch mechanisms are provided in the first-stage gears 22 and 28 mounted on the motor shafts, respectively, each clutch mechanism may be provided at another position in the associated transmission gear train. Further, the clutch mechanism is not limited to the slipping clutch mechanism, but a mesh type clutch mechanism, for example, may be employed.

The above description is given of the arrangement of the strobe device 1. The head unit 2 which is stopped at predetermined lateral and vertical rotation angles in the lateral drive mechanism 62 and the vertical drive mechanism 63 (hereinafter also simply referred to as the drive mechanisms 62 and 63) is held only by the connection forces of the clutch mechanisms 64-1 and 64-2, and hence there is a possibility that each rotation angle of the head unit 2 is changed e.g. due to an unexpected collision. If the head unit 2 is rotated to an angle which is not intended by the user, illumination light is not properly irradiated onto an object, which generates a failure photograph. Although it is necessary to make the connection forces of the clutch mechanisms 64-1 and 64-2 very high to ensure the holding forces for holding the head unit 2, the drive mechanisms 62 and 63 are required to have a strength corresponding to the increased connection force of the clutch mechanism 64, which can result in an increase in the sizes of the drive mechanisms 62 and 63. It is possible to envisage a method of detecting a change in the angle of the head unit 2, and quickly returning the angle of the head unit 2 to the original one, but there is a possibility that the user intentionally rotates the head unit 2 by hand, and hence it is necessary to determine whether the head unit 2 is manually rotated as a bounce angle-changing operation, or the angle of the head unit 2 is unexpectedly changed. To cope with this, the CPU 16 determines whether the head unit 2 is intentionally or unexpectedly rotated, and performs control for storing the changed rotation angle or returning the head unit 2 to the position at the original rotation angle, according to a result of the determination. This control will be described with reference to FIG. 8.

Figure 8:
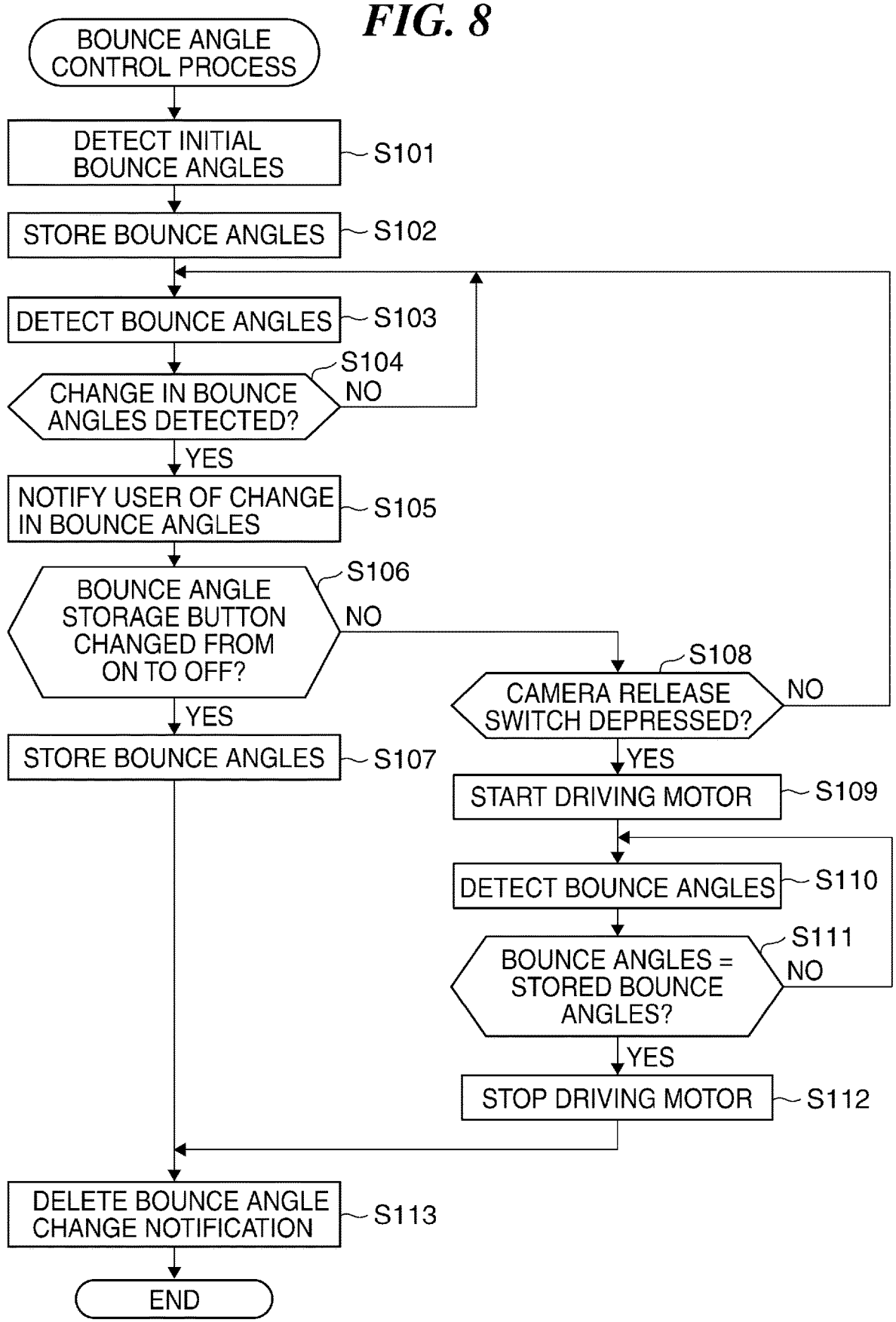
FIG. 8 is a flowchart of a bounce angle control process performed by the strobe device as the lighting device according to the first embodiment.

FIG. 8 is a flowchart of the bounce angle control process. This bounce angle control process is realized by the CPU 16 that reads out and executes a program stored in a storage section, such as a ROM, included in the CPU 16. The bounce angle control process is started when the manual bounce mode is set, and is performed at predetermined time intervals. The bounce angle control process may be configured to be repeatedly performed during standby after the strobe device 1 is powered on. Note that almost the same process is performed when the position of the head unit 2 is changed in either of the vertical and lateral directions, and hence in the following description, whether the position of the head unit 2 is changed in the vertical or lateral direction is not distinguished unless it is necessary. In the bounce angle control process in FIG. 8, the CPU 16 functions as a control unit of the present invention.

First, in a step S101, the CPU 16 detects initial bounce angles of the head unit 2 via the bounce angle detection circuit 61 based on results of the detection by the potentiometers 33 and 34. The initial bounce angles are bounce angles detected when the present process is started, and are not limited to the angles of the normal position. In a step S102, the CPU 16 stores the detected initial bounce angles in the storage circuit 72. In a step S103, the CPU 16 detects current bounce angles of the head unit 2 via the bounce angle detection circuit 61 based on results of the detection by the potentiometers 33 and 34. In a step S104, the CPU 16 compares the initial bounce angles stored in the storage circuit 72 and the current bounce angles, detected in the step S103, and determines whether or not the bounce angles (rotation angles) of the head unit 2 have been changed from the initial bounce angles. The CPU 16 monitors the bounce angles for a change by repeating the steps S103 and S104 until a change in the bounce angles is detected.

Then, if a change in the bounce angles is detected, the CPU 16 proceeds to a step S105, wherein the CPU 16 notifies (informs) the user of the change in the bounce angles by displaying a notification to the effect that there is a change in the bounce angles, on the LCD 17 via the display circuit 68. As an example of the notification of the change in the bounce angle, a mark or a character (or a character string) indicating that there is a change in the bounce angles is displayed on a screen shown in FIG. 5B. In addition to the mark or character/character string, the CPU 16 displays the current bounce angles on the indicators 56 and 58. In a step S106, the CPU 16 determines, based on a signal received from the small board 44, whether or not the predetermined operation for releasing the storage button 42 from the depressed state (operation for shifting the storage button 42 from the on state to the off state) has been performed. If it is determined in the step S106 that the predetermined operation of the storage button 42 has been performed, it is possible to judge that the user has intentionally changed the bounce angles, and hence the CPU 16 proceeds to a step S107. In the step S107, the CPU 16 stores the bounce angles detected in the step S103 in the storage circuit 72 as the new bounce angles of the head unit 2. With this, when the predetermined operation is performed, the bounce angles detected last time are stored in the storage circuit 72. Therefore, the contents stored in the storage circuit 72 are updated to the latest bounce angles. After that, in a step S113, the CPU 16 deletes the notification of the change in the bounce angles displayed on the LCD 17. Note that it is unnecessary to delete the current bounce angles. Then, the bounce angle control process in FIG. 8 is terminated.

On the other hand, if it is determined in the step S106 that the predetermined operation of the storage button 42 has not been performed, it is possible to judge that the head unit 2 has been rotated not intentionally but unexpectedly e.g. due to interference with a foreign body, and hence the CPU 16 proceeds to a step S108. In the step S108, the CPU 16 communicates with a camera MPU (not shown) of the camera 70 connected to the connection terminals 6, via the communication terminals 6, and determines whether or not the first switch SW1 of the release switch 71 has been turned on. If the first switch SW1 of the release switch 71 has not been turned on, it is considered that the user has no intention to start shooting yet, and hence the CPU 16 returns to the step S103. The operation for turning on the first switch SW1 is an operation for instructing a shooting preparation, such as focusing and photometry. Therefore, if the predetermined operation is not performed and also the shooting preparation operation is not performed on the camera 70 connected to the controller 4, detection of the bounce angles is continued.

On the other hand, if the first switch SW1 of the release switch 71 has been turned on, it is possible to judge that the user has an intention to start shooting. Then, in a step S109, the CPU 16 starts the control of the drive motors 21 and 27 so as to drive the head unit 2 for rotation to a target position corresponding to the initial bounce angles stored in the storage circuit 72. Next, in a step S110, the CPU 16 detects bounce angles via the bounce angle detection circuit 61 based on results of the detection by the potentiometers 33 and 34 again. In a step S111, the CPU 16 compares the current bounce angles detected in the step S110 and the initial bounce angles stored in the storage circuit 72 in the step S102, and determines whether or not the both angles are equal to each other. Then, if the both angles are not equal to each other, the CPU 16 repeats the steps S110 and S111. Therefore, the driving of the head unit 2 by the drive motors 21 and 27 and detection of the bounce angles are continuously performed. Then, when the current bounce angles become equal to the initial bounce angles corresponding to the target position to which the head unit 2 is to be rotated, the CPU 16 proceeds to a step S112.

In the step S112, the CPU 16 stops the operation of the drive motors 21 and 27 to thereby stop rotation of the head unit 2. With this, when a change in the bounce angles is detected, if the photographing preparation operation is performed on the camera 70 in a state in which the predetermined operation is not performed, the head unit 2 is returned to the position corresponding to the initial bounce angles stored in the storage circuit 72. Therefore, since the head unit 2 is automatically returned to the original rotational position when the head unit 2 is unintentionally rotated, it is possible to automatically return the head unit 2 to the original position, before shooting at the latest, even if the user does not notice the change in the bounce angles. After that, the CPU 16 proceeds to the step S113.

According to the present embodiment, when rotation of the head unit 2 from the initial bounce angles is detected, if the predetermined operation for releasing the storage button 42 from the depressed state is performed, the rotation angles of the head unit 2, detected last time, are stored in the storage circuit 72. This makes it possible to store the rotation angles of the head unit 2, on which a user's intention is properly reflected. On the other hand, when rotation of the head unit 2 is detected, if the photographing preparation operation is performed on the camera 70 connected to the controller 4 in a state in which the predetermined operation of the storage button 42 is not performed, the head unit 2 is returned to the position corresponding to the rotation angles stored in the storage circuit 72. This makes it possible to automatically return the head unit 2 to the original position, before shooting at the latest, even if the head unit 2 is unintentionally rotated. Since the head unit 2 is maintained at the initial bounce angles in a case where the user has no intention to change the rotation angles, it is possible to avoid a situation in which shooting is started in a state in which an irradiation direction has been changed to an unintended direction due to unexpected rotation of the head unit 2.

Further, since the storage button 42 is placed on the X-axis (shaft portion 37a) on the right side surface of the head unit 2, the position of the storage button 42 is easy to find even after rotating the head unit 2, and the storage button 42 is easily visible from the user also when the user is using the vertical position grip 74. Further, this arrangement is useful to prevent the user from erroneously operating the storage button 42, and it is easy for the user to perform the operation for setting a change of the rotation angles.

Further, when there is a change in the rotation angles of the head unit 2, the change in the bounce angles is displayed, and hence the user can determine whether or not to perform the operation for releasing the storage button 42 after viewing the display. This makes it easy for the user to be aware that the user himself/herself is performing the operation for changing the rotation angles.

Here, a description will be given of variations of the placement of the storage button 42. The variations of the placement of the storage button 42, shown in FIGS. 9A to 9D and 10A to 10C, are envisaged from the viewpoints of securing visibility, securing operability, and prevention of an erroneous operation of the storage button 42.

Figure 9A:
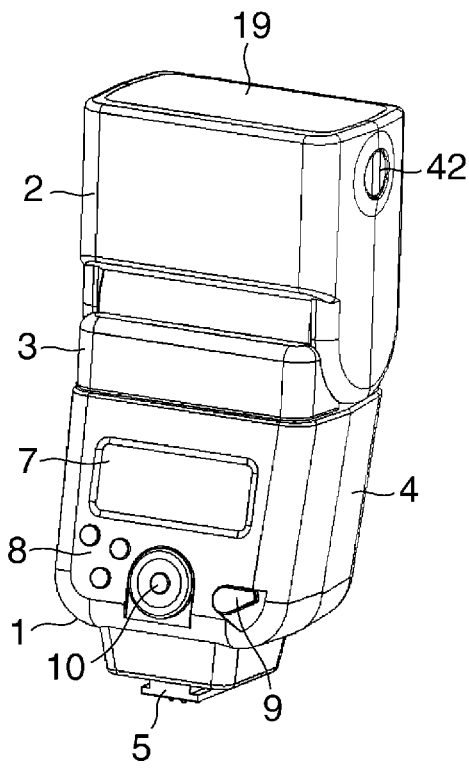
FIG. 9A is a perspective view of a first variation of the strobe device.
Figure 9B:
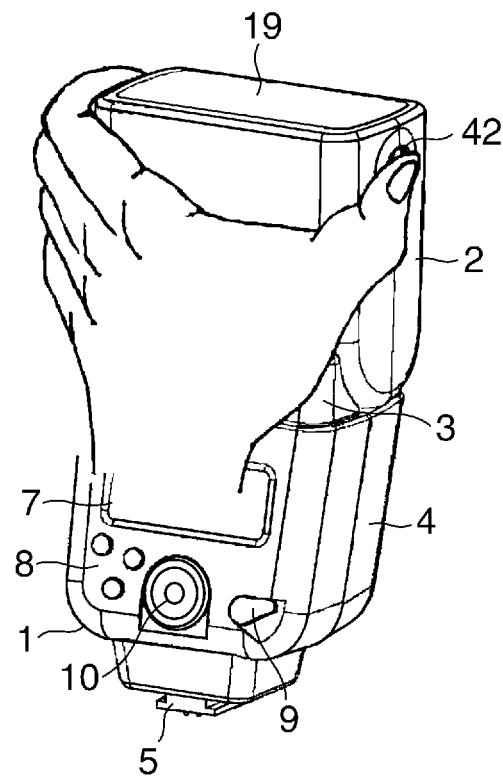
FIG. 9B is a perspective view of the strobe device shown in FIG. 9A, in a state in which a head unit is directly held by hand.
Figure 9C:
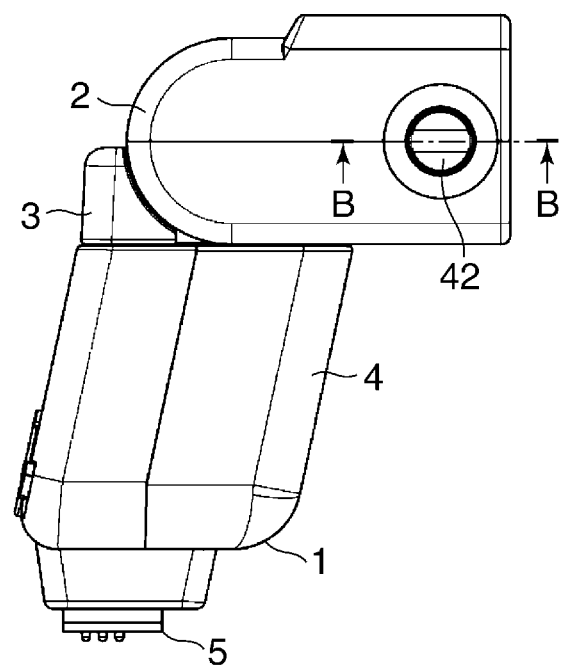
FIG. 9C is a side view of the strobe device shown in FIG. 9A.
Figure 9D:
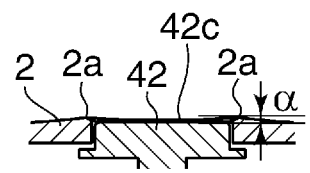
FIG. 9D is a cross-sectional view taken along B-B in FIG. 9C.

FIG. 9A is a perspective view of a first variation of the strobe device 1, FIG. 9B is a perspective view of the strobe device 1, shown in FIG. 9A, in a state in which the head unit 2 is directly held by hand, FIG. 9C is a side view of the strobe device 1, shown in FIG. 9A, and FIG. 9D is a cross-sectional view taken along B-B in FIG. 9C. As shown in FIGS. 9A and 9C, the storage button 42 is placed on the right side surface of the head unit 2 at a location close to the light emission surface. That is, the storage button 42 is placed on the right side surface of the head unit 2, in the vicinity of the Fresnel lens 19. By placing the storage button 42 as above, when the user directly holds and moves the head unit 2 by hand, as shown in FIG. 9B, the user can easily place his/her finger on the storage button 42, and easily perform an operation for rotating the head unit 2 and a button operation, in parallel.

However, there is a fear that when the head unit 2 is rotated by an unexpected external force e.g. due to collision against a wall or an obstacle, the storage button 42 is simultaneously depressed to thereby cause the bounce angles detected from the changed position to be stored. To avoid this problem, as shown in FIG. 9D, it is desirable to set the level of a portion 2a of the housing of the head unit 2, around the storage button 42, to be higher than the level of an operating surface 42c of the storage button 42 by a predetermined distance α. This reduces the fear that the storage button 42 is unintentionally depressed. Note that the configuration shown in FIG. 9D can be employed irrespective of the location or position where the storage button 42 is placed. Note that the storage button 42 may be placed not on the right side surface, but on the left side surface.

Figure 10A:
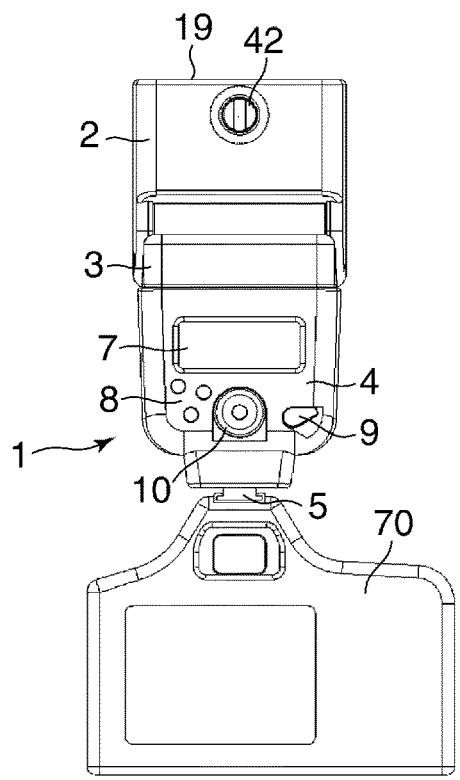
FIG. 10A is a rear view of a second variation of the strobe device to which a camera is connected.
Figure 10B:
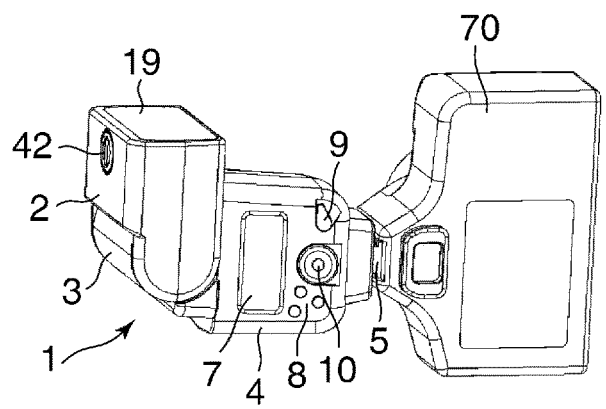
FIG. 10B is a perspective view of the strobe device shown in FIG. 10A.
Figure 10C:
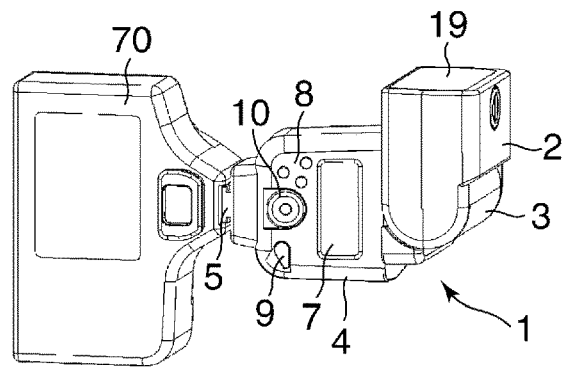
FIG. 10C is a perspective view of the strobe device shown in FIG. 10A.

FIGS. 10A to 10C are a rear view, a perspective view, and another perspective view of a second variation of the strobe device 1 to which the camera 70 is connected. In the second variation, the storage button 42 is placed on an upper surface of the head unit 2. Since the head unit 2 is movable, the upper surface of the head unit 2 is defined as a surface of the head unit 2 on a side far from the image pickup apparatus (camera 70) connected to the controller 4, when the head unit 2 is in a posture oriented in the shooting direction of the image pickup apparatus, i.e. when the head unit 2 is in the normal position.

By placing the storage button 42 as above, it is possible to always make the storage button 42 easily visible from a user's side irrespective of whether the camera 70 is in a landscape position (see FIG. 10A) or in a portrait position (see FIGS. 10B and 10C), and further, irrespective of the rotational position of the head unit 2. More particularly, as shown in FIGS. 10B and 10C, if the camera 70 is not equipped with a vertical position grip, the user can bring the strobe device 1 to both of a position in which it is on the left side as shown in FIG. 10B, and a position in which it is on the right side as shown in FIG. 10C. Also in these cases, since the storage button 42 is on the upper surface of the head unit 2, the storage button 42 is easily visible.

Next, a description will be given of a second embodiment of the present invention. The second embodiment differs from the first embodiment in the timing in which the changed bounce angles are stored and the timing in which the head unit 2 is returned to a position corresponding to the original bounce angles, and the other configurations including the configuration of hardware are the same as those of the first embodiment. Therefore, the following description is mainly given of the different points from the first embodiment with reference to FIG. 11 in place of FIG. 8.

Figure 11:
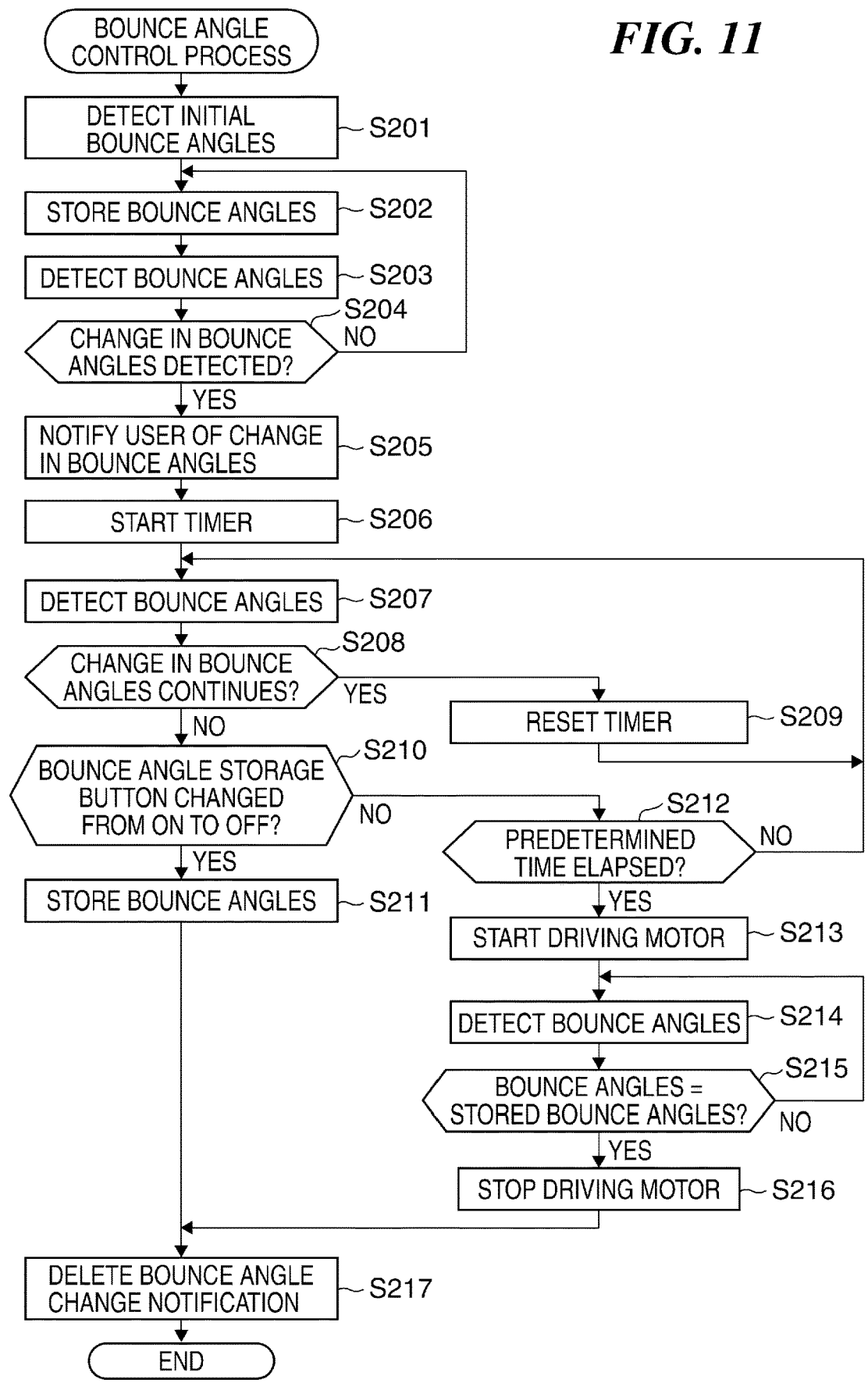
FIG. 11 is a flowchart of a bounce angle control process performed by a strobe device as a lighting device according to a second embodiment of the present invention.

FIG. 11 is a flowchart of a bounce angle control process performed in the second embodiment. The bounce angle control process is realized by the CPU 16 that reads out and executes a program stored in the storage section, such as the ROM, included in the CPU 16. The conditions for starting this process and the intervals at which this process is executed are the same as those of the bounce angle control process in FIG. 8. Further, similar to the bounce angle control process, whether the position of the head unit 2 is changed in the vertical or lateral direction is not distinguished unless it is necessary.

In steps S201 to S205, the CPU 16 executes the same processing as in the steps S101 to S105 in FIG. 8. In a step S206, the CPU 16 starts a timer. The timer is realized by the above-mentioned program, and is operated by the CPU 16. In a step S207, the CPU 16 detects bounce angles via the bounce angle detection circuit 61 based on results of the detection by the potentiometers 33 and 34 again. In a step S208, the CPU 16 determines based on a result of the detection in the step S207 whether or not a change in the bounce angles continues. More specifically, when the step S207 is executed for the first time, the CPU 16 compares the bounce angles with the bounce angles detected in the step S203, and when the step S207 is executed for the second or subsequent time, the CPU 16 compares the currently detected bounce angles with the bounce angles detected in the preceding execution of the step S207. Then, if a result of the comparison indicates a difference, the CPU 16 determines that a change in the bounce angles continues.

If it is determined in the step S208 that a change in the bounce angles continues, the CPU 16 resets the timer in a step S209, and returns to the step S207. On the other hand, if the change in the bounce angles has stopped, the CPU 16 proceeds to a step S210. In the step S210, the CPU 16 executes the same processing as in the step S106 in FIG. 8. If it is determined in the step S210 that the predetermined operation of the storage button 42 has been performed, it is possible to judge that the user has intentionally rotated the head unit 2 and stopped the same at a position corresponding to the desired bounce angles, and hence the CPU 16 proceeds to a step S211.

On the other hand, if it is determined in the step S210 that the predetermined operation of the storage button 42 has not been performed, it is possible to judge that the head unit 2 has been rotated not intentionally but unexpectedly e.g. by interference with a foreign body, and hence the CPU 16 proceeds to a step S212. In the step S212, the CPU 16 determines whether or not a predetermined time period (e.g. several seconds) has elapsed after starting the timer (step S206) or after resetting the timer (step S209). If it is determined in the step S212 that the predetermined time period has not elapsed, the CPU 16 returns to the step S207. Therefore, even when the change in the bounce angles has stopped, detection of the bounce angles is continued until the predetermined time elapses unless the predetermined operation of the storage button 42 is performed.

In the step S211, the CPU 16 stores the bounce angles detected in the step sS207 in the storage circuit 72 as new bounce angles of the head unit 2. With this, if the predetermined operation of the storage button 42 is performed before the predetermined time period elapses after the rotation of the head unit 2 is detected last time, the bounce angles detected last time are stored in the storage circuit 72. Therefore, the contents stored in the storage circuit 72 are updated to the latest bounce angles. Note that the bounce angles are not stored in a state in which the change in the bounce angles continues. After execution of the step S211, in a step S217, the CPU 16 executes the same processing as in the step S113 in FIG. 8, followed by terminating the process in FIG. 11.

On the other hand, if it is determined in the step S212 that the predetermined time period has elapsed, the CPU 16 proceeds to a step S213. In the steps S213 to S216, the CPU 16 executes the same processing as in the steps S109 to S112 in FIG. 8. Therefore, if the predetermined time period elapses without the predetermined operation of the storage button 42 after the change in the bounce angles has stopped, the head unit 2 is returned to the position corresponding to the initial bounce angles stored in the storage circuit 72.

According to the present embodiment, when rotation of the head unit 2 from the initial bounce angles is detected, the bounce angles detected last time are stored according to the predetermined operation of the storage button 42. This makes it possible to obtain the same advantageous effects as provided by the first embodiment with respect to processing for storing the bounce angles of the head unit, on which a user's intention is properly reflected. Further, if the predetermined time period elapses without the predetermined operation of the storage button 42 after the rotation of the head unit 2 is detected last time, the head unit 2 is returned to the position corresponding to the rotation angles stored in the storage circuit 72. With this, if it is judged that the head unit has not been intentionally rotated, it is possible to automatically return the head unit 2 to the original position. If the predetermined operation of the storage button 42 is performed before the predetermined time period elapses after the rotation of the head unit 2 is detected last time, the bounce angles detected last time are stored in the storage circuit 72. With this, if it is judged that the head unit 2 is intentionally rotated, it is possible to store the latest bounce angles of the head unit 2.

Note that in the above-described embodiments, the storage button 42 as the operation portion is described by way of example, and may be any operation portion insofar as it can be depressed and then be released from the depressed state. For example, the operation portion may be e.g. an electrostatic touch sensor.

Although the vertical potentiometer 33 and the lateral potentiometer 34 are implemented by the resistance type rotation angle detection sensors, this is not limitative. For example, each potentiometer may be an optical sensor, or a sensor using e.g. a commercial absolute encoder.

Note that with a view to realizing the control of rotation of the head unit 2, the vertical drive motor 27 and the lateral drive motor 21 are each implemented by the DC motor, and bounce angle detection by the bounce angle detection circuit 61 is employed, but this is not limitative. For example, the control of rotation of the head unit 2 can be realized by a combination of a bounce angle detection circuit having relatively coarse resolution and a pulse motor (or a rotary pulse plate provided in the drive mechanism).

Although the strobe device 1 is mounted on the image pickup apparatus, by way of example, the present invention can also be applied to the arrangement in which the strobe device 1 is incorporated in the image pickup apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-207666 filed Oct. 24, 2016, which is hereby incorporated by reference herein in its entirety.

What is claimed is:

1. A lighting device comprising:
a first housing;
a second housing that has a light emission section and is rotatable with respect to the first housing;
a control unit;
a detection unit configured to detect relative position information of the second housing with respect to the first housing;
a storage section configured to store the relative position information detected by the detection unit when caused by the control unit;
a drive unit configured to cause the second housing to rotate with respect to the first housing based on the relative position information stored in the storage section; and
a single operation button configured to be depressed and released,
wherein the control unit is configured to cause the relative position information detected by the detection unit not to be stored in the storage section in response to the operation button being depressed, and
wherein the control unit is configured to cause the relative position information detected by the detection unit to be stored in the storage section in response to the operation button being released.

2. The lighting device according to claim 1, wherein the second housing is connected to an upper side of the first housing, and
wherein the operation portion is placed on an axis of a rotation shaft around which the second housing is rotated in a vertical direction with respect to the first housing.

3. The lighting device according to claim 2, wherein a direction of depression of the operation portion is parallel to the axis of the rotation shaft.

4. The lighting device according to claim 1, wherein the second housing is connected to an upper side of the first housing, and
wherein the operation portion is placed on either of left and right sides of the second housing.

5. The lighting device according to claim 1, wherein the second housing is connected to an upper side of the first housing, and
wherein the operation portion is placed on an upper surface of the second housing.

6. The lighting device according to claim 1, wherein the control unit causes latest relative position information detected by the detection unit to be stored in the storage section, in response to the predetermined operation on the operation portion.

7. The lighting device according to claim 1, wherein the drive unit causes the second housing to rotate with respect to the first housing based on the relative position information stored in the storage section, in a case where the predetermined operation on the operation portion is not performed for a predetermined time period and also a change in the relative position information is not detected, after a change in the relative position information from the relative position information stored in the storage section is detected.

8. The lighting device according to claim 1, wherein the relative position information is a rotation angle of the second housing with respect to the first housing.

* * * * *